Aug. 6, 1929. H. M. HOBART 1,723,857
ELECTRIC POWER SYSTEM
Filed Dec. 21, 1921  3 Sheets-Sheet 1
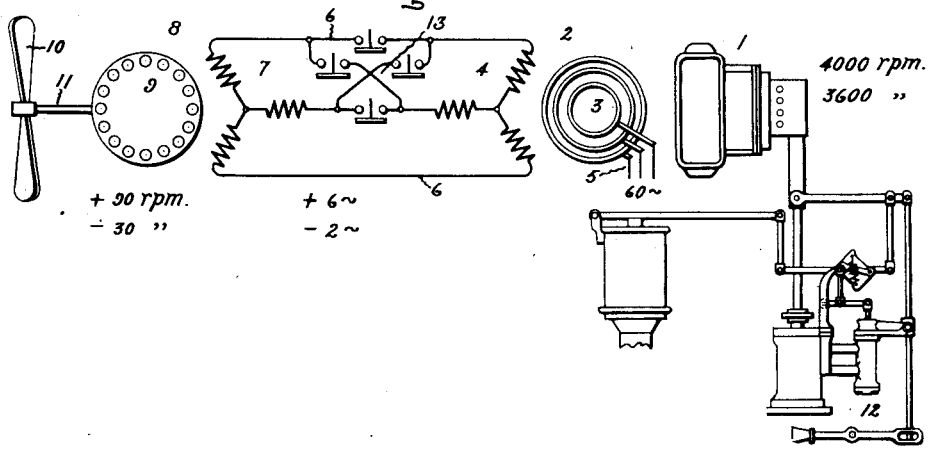
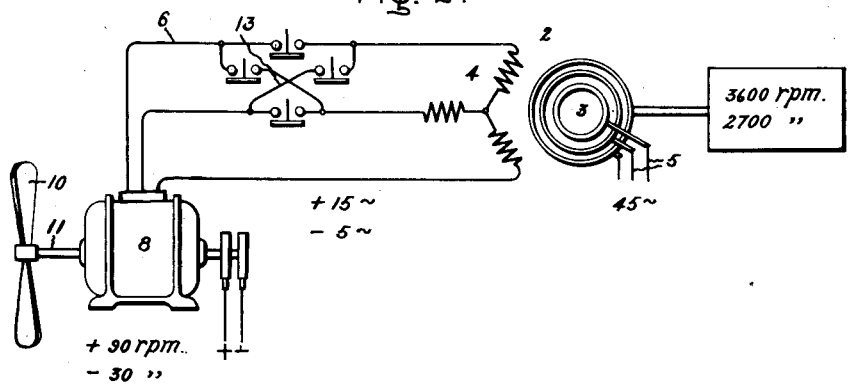
Inventor:
Henry M. Hobart,
by Albert G. Davis
His Attorney.

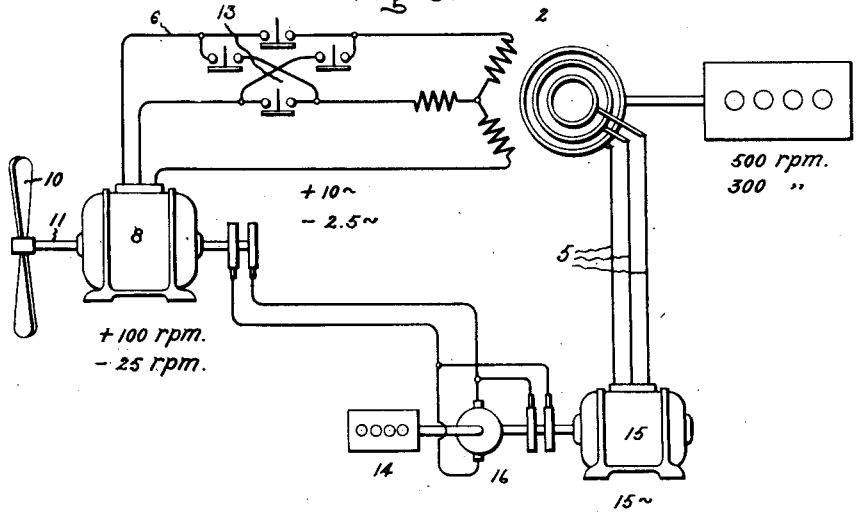
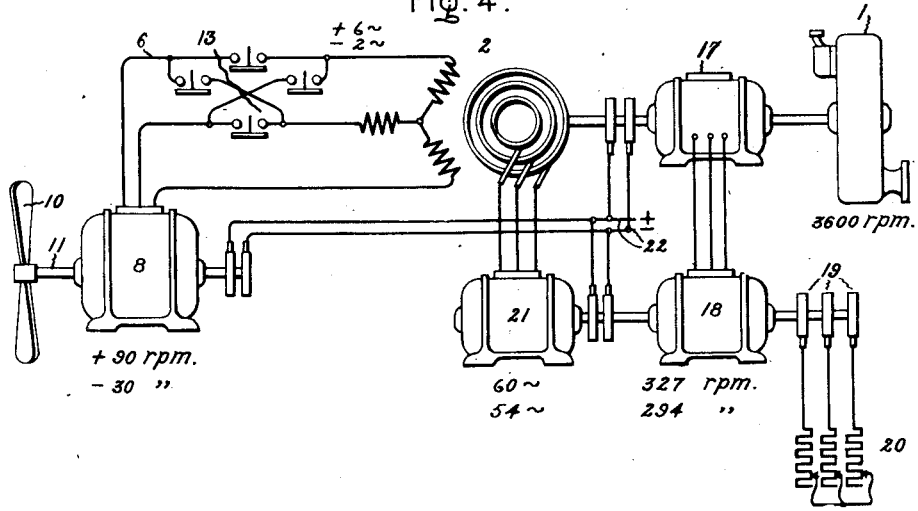

Aug. 6, 1929.   H. M. HOBART   1,723,857
ELECTRIC POWER SYSTEM
Filed Dec. 21, 1921   3 Sheets-Sheet 3
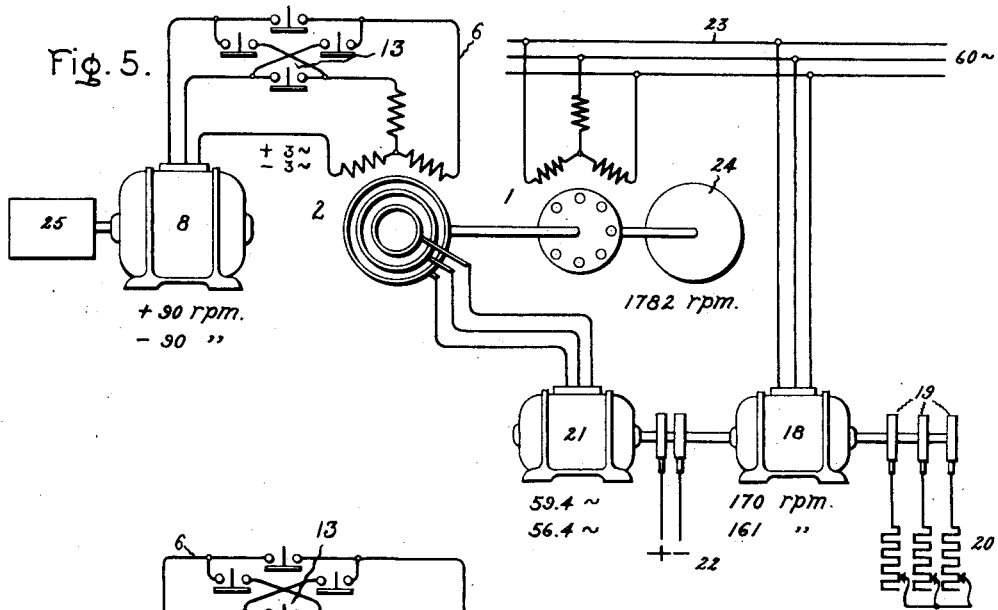
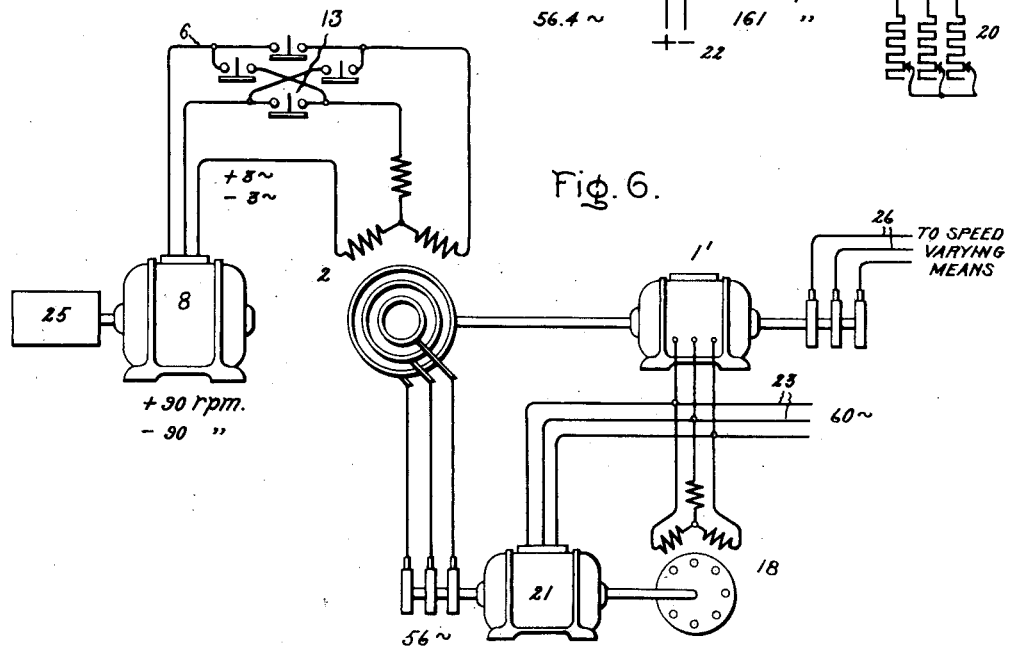
Inventor:
Henry M. Hobart,
by Albert G. Davis
His Attorney.

Patented Aug. 6, 1929.

1,723,857

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC POWER SYSTEM.

Application filed December 21, 1921. Serial No. 523,970.

My invention relates to electric power systems and more particularly to systems involving the control of low speed alternating current motors the speed and direction of rotation of which are controlled by changing the frequency and phase rotation of the alternating current supplied thereto. My invention is particularly adapted to systems of electric ship propulsion, but is especially useful wherever the work motor or motors constitute substantially the sole load for an alternating current generator and where the motor is required to reverse under load.

An object of my invention is to provide a system of the class described which shall enable full advantage to be taken of the superior qualities of very low frequency motors for low speed work and at the same time, and without the use of reduction gearing, enable any type of prime mover to be run at as high a speed as may be desirable for economical operation of the prime mover. Low frequency motors are especially applicable where quick and efficient change of speed and reversal are desired since their rotors are of small diameter and consequently have low momentum.

In the interests of space and economy the alternating current generator of an electric ship propulsion system should be directly connected to its driving engine, and where an elastic fluid turbine is used, the high speed required for efficient operation of the turbine ordinarily results in a comparatively high frequency current supply for the propeller driving motors even though a bipolar generator be used. The design of the propeller driving motors for the low speeds necessary for direct connection to the propellers is, on the other hand, greatly handicapped by a high frequency source of supply. In my U. S. Patent No. 1,304,181, May 20, 1919, I have pointed out the advantages of low frequency propeller driving motors from the standpoints of design and efficiency of operation. My present invention comprises an improved method of obtaining and utilizing such low frequency current in the operation and control of alternating current motors of either the induction or synchronous type.

I accomplish the objects of my invention by replacing the ordinary field rotor of a high speed, polyphase, alternating current generator by a wound rotor to which is supplied a polyphase, alternating current connected to set up a magnetic field therein rotating, with respect to the rotor, oppositely to the direction in which the rotor is driven. I may then obtain from such a generator a low frequency alternating current for driving the low speed motor, said frequency being equal to the difference between the frequency of the current supplied to excite the rotor and the frequency which would be obtained from the generator with direct current excitation of the same number of poles. By designing the slow speed motor for a comparatively low frequency and by properly selecting the frequency of the exciting current so as to make the speed of the rotating field comparable to the speed of the rotor, the motor may be reversed at or near zero frequency and its speed may be varied in either direction through a wide range upon merely varying one of said speeds of rotation with respect to the other by a comparatively small amount. With relation to its position in space the rotating field varies from rest to a speed in the direction of rotation of the rotor corresponding to the frequency of the currents in the stator windings.

The foregoing discussion relates broadly to the simpler forms of my invention. I have further provided certain advantageous modifications in and additions to the system as hereinbefore broadly defined which will be fully described hereinafter in connection with practical applications of my invention in ship propulsion and rolling mill work, but I do not propose to be limited to such installations as the broader application of my invention will be evident to those skilled in the art. The novel features which I believe to be patentably characteristic of my invention are definitely pointed out in the appended claims.

The arrangement of the various apparatus in the system of my invention and the mode of operation of the system will be better understood from the following description taken in connection with the accompanying drawings in which Fig. 1 diagrammatically illustrates my invention used in connection with a ship propulsion system comprising an adjustable speed prime mover and a propeller driving motor of the induction type; Fig. 2 illustrates a similar installation where the propeller motor is of the synchronous type; Fig. 3 diagrammatically illustrates my invention applied to a comparatively slow speed generator and shows an auxiliary engine for driving the alternating current and direct current exciters; Fig. 4 diagrammatically illustrates my invention in a system of ship propulsion comprising a constant speed prime mover and means for varying the frequency of the polyphase excitation supplied to the generator; and Figs. 5 and 6 diagrammatically illustrate practical applications of my invention to rolling mill work.

In order to make my invention easily understood I shall assume certain specific values of speeds and certain specific ranges of frequency and to facilitate the description I have added legends to the figures of the drawing indicating those speeds and frequencies, but it is, of course, understood that my invention is not limited to the particular values assumed.

Referring to Fig. 1 of the drawings, there is diagrammatically represented an electric ship propulsion system in which a high speed, elastic fluid turbine 1 is direct-connected to drive the rotor 3 of a high speed, polyphase alternator 2, the stator of which is represented at 4. The rotor 3 is wound so as to be excited by polyphase alternating current supplied through slip rings and the leads 5 from a suitable source not shown. The phase rotation of this polyphase excitation is such that the rotating magnetic field set up thereby rotates backwardly with respect to the rotor, that is, oppositely to the direction in which the rotor is driven by the steam turbine. The stator winding 4 of the alternator is electrically connected through mains 6 and reversing switch 13 to the stator 7 of a polyphase induction motor 8 whose squirrel cage rotor 9 is direct-connected to a ship propeller 10, through a shaft 11.

For the purpose of further showing the particular advantages of my invention, I will cite a specific equipment for which the system shown in Fig. 1 has been particularly designed.

The steam turbine 1 is designed to furnish some 1500 hp. while running at 4000 R. P. M. and is adapted to have its speed varied between 4000 and 3600 R. P. M. by the usual throttling means indicated at 12. The direct-connected alternator 2 is a bipolar 3-phase machine and its bipolar wound rotor is adapted to be excited by 3-phase 60 cycle current. The induction motor 8 is a 3-phase, 8-pole machine designed to drive the ship while running at 90 R. P. M. at about 9 knots and is adapted to have its speed varied to drive the ship at any lower speed or to reverse the propeller and drive it at a low speed in the opposite direction. When the rotor 3 of the alternator is being driven at 3600 R. P. M. in one direction, its speed will be just equal to and opposite in direction to the speed of the rotating magnetic field set up by the 60 cycle exciting current in the bipolar rotor. Consequently, the frequency induced in the alternator stator will be zero, but if the speed of the turbine is increased to 3960 R. P. M. a 3-phase, alternating current of 6 cycles will be generated in the alternator stator and will be available for driving the motor, neglecting slip, at 90 R. P. M. in the ahead direction. If, when the speed of the turbine has been lowered to 3600 R. P. M., the switch 13 is reversed and the speed again increased to 3720 R. P. M., a 3-phase, alternating current of 2 cycles will be generated and will be available to drive the motor, neglecting slip, at 30 R. P. M. in the reverse direction, representing an astern speed of the ship of about 3 knots.

It is seen that as thus designed, the vessel can be driven at any ahead speed up to 9 knots and at any astern speed up to 3 knots by simply regulating the speed of the steam turbine to the proper point within the comparatively small range of 3960 R. P. M. and 3600 R. P. M. The turbo-generator speeds, the corresponding cycles, the propeller speeds and the ship speeds are shown in the following table.

| Speed of turbo-generator | Frequency at motor | Speed of propeller neglecting slip | Approximate speed of ship |
|---|---|---|---|
| R. P. M. | | R. P. M. | Knots |
| 3960 | 6 | 90 | 9.0 |
| 3900 | 5 | 75 | 7.5 |
| 3840 | 4 | 60 | 6.0 |
| 3780 | 3 | 45 | 4.5 |
| 3720 | 2 | 30 | 3.0 |
| 3660 | 1 | 15 | 1.5 |
| 3600 | 0 | 0 | 0 |
| 3660 | −1 | −15 | −1.5 |
| 3720 | −2 | −30 | −3.0 |

This system has the desirable feature that the turbine speed is the highest when the maximum power is required. The 60 cycle excitation may be supplied from an independently driven 100 kw set which could also supply the lighting for the ship and constitutes a source of power for auxiliaries in general. The 1500 hp. 8-pole, squirrel cage induction motor 8 will have a power factor of about 0.95 and it will be of quite small diameter relative to its length. The cost of such a motor is relatively low for its capacity. The alternator of the turbo-generator set will have to be designed of the same size as regards magnetic flux and turns as if it were driven at 360 R. P. M. instead of at its rotor's speed of 3600 R. P. M. Consequently, it will have to be rather large. This disadvantage is more than overcome by the other attractive advantages which my system makes possible. A change of any amount in the speed of the ship's propeller may be accomplished by simply altering the speed of the turbine or, as will be explained in connection with Fig. 4, by simply varying the speed of the exciter set for the main alternator through a small percentage of its normal speed. The load on the equipment during such a change will depend upon the rate of change of speed and may be smoothly controlled up to the maximum load the equipment can carry for a short time. Since the propeller motor's speed at all times follows closely the changes in the periodicity of the generated current, this load may be very great without danger of the motor and generator pulling apart.

It is apparent that the various features of my invention when used in a ship propulsion system reduce the cost, weight and space required for the equipment, improve the economy, simplify the control and contribute to the reliability of operation.

While a very low periodicity for the motor enables one to obtain a design of smaller diameter and greater core, length and consequently lower cost than can be obtained with a higher frequency, a compromise may be preferable for a ship of the size and character assumed. For example, the speed of the turbo-generator set may be arranged to be varied from the normal speed of 3600 R. P. M. down to 2700 R. P. M. Its laminated bipolar rotor may be supplied with 3-phase, 45 cycle current from an independent source of constant periodicity. At a speed of 3600 R. P. M. of the turbo-generator, an alternating current of a periodicity of 15 cycles will be delivered to the motor. If a 20-pole propeller driving motor be used this motor will be driven at 90 R. P. M., corresponding to a 9 knot speed of the ship. The ahead speed may be controlled from 9 knots down to zero by adjusting the speed of the turbo-generator set from 3600 R. P. M. to 2700 R. P. M. When the switch 13 is reversed and the speed increased to 3000 R. P. M. the propeller will be driven at 30 R. P. M. in the reverse direction, corresponding to a 3 knot speed of the ship in the astern direction. The rotor core of the generator would be approximately 23 inches in diameter and 46 inches long. Since the rotor will have a core loss corresponding to the 45 cycle excitation its design will be handicapped from the standpoint of heating as compared with direct current excitation.

Fig. 2 diagrammatically illustrates a ship propulsion system with the frequencies and speeds of rotation just outlined and shows a propeller driving motor of the synchronous type. The synchronous motor may be run overexcited so as to relieve the rotor windings of the generator of most of the burden of providing the excitation. The excitation will in large measure be provided from the generator stator windings by virtue of the leading current consumed by the synchronous motor. With the assistance of this feature the design of the rotor will be greatly simplified as compared with a rotor of such proportions as to be capable of supplying the entire excitation. Such a generator will be smaller and cheaper and more efficient than one designed with space on the rotor for the entire required magnetomotive force.

Even where a synchronous motor is used I preferably provide a squirrel cage winding or its equivalent to insure that the motor gets into step under the worst maneuvering conditions, as for example, where it is desired to effect a quick reversal while the ship is drifting.

Fig. 3 represents, diagrammatically, an electric ship propulsion scheme to which my invention is applied when the prime mover is a comparatively low speed machine. For the purposes of illustrating the application of my invention to this condition, I will take the case of a cargo ship in which the prime mover is a Diesel engine having a normal speed of 500 R. P. M. Referring to Fig. 3, 1 represents a Diesel engine designed to run at a maximum speed of 500 R. P. M. and to be regulated down to a speed of 300 R. P. M. by throttle control. A 6-pole, 3-phase generator direct connected to the engine 1 is represented at 2. The rotor of this generator is wound for 3-phase excitation. A 12-pole synchronous motor 8 is direct connected to the propeller 10 through shaft 11 and designed to run at a maximum speed of 100 R. P. M. and to drive the ship ahead while running at this speed at about 10 knots. The motor 8 is connected through the transmission line 6 and reversing switch 13 to the stator of the generator 2.

For furnishing the alternating current excitation for the generator of this equipment, a source of 15 cycle, constant frequency, 3-phase current may be used. This is obtained through the line 5 from the generator 15 of an independently driven exciting set consisting of a small, constant speed gasoline engine 14, direct connected to a 15 cycle alternating current generator 15. The direct current exciter 16 for furnishing excitation to the synchronous motor 8 and to the generator 15 may be mounted on the shaft of engine 14.

The principle of operation of this system is similar to that described in connection with Figs. 1 and 2. Assume the exciter set to be running and delivering excitation to the synchronous motor 8 and the generator 2 and assume the engine 1 to be driving the rotor of the 6-pole generator at 500 R. P. M. in a direction opposite to the direction of rotation of the polyphase field set up therein by the 15 cycle current. Then in the stator of the generator 2 a 10 cycle 3-phase alternating current will be generated which will be available to drive the 12-pole propeller motor 8 at its maximum speed of 100 R. P. M., corresponding to the ahead speed of the ship of 10 knots. If the engine speed is reduced to 400 R. P. M., the periodicity of the current thus delivered from the generator will be reduced to 5 cycles, the motor 8 will then run at 50 R. P. M. and the ship will be driven ahead at substantially half speed. If the engine speed is further reduced to 300 R. P. M., the generator periodicity will become zero and no power will be delivered to the motor. But, if the engine speed is then increased to 350 R. P. M., switch 13 having first been reversed, a 2½ cycle current of reversed phase rotation will be available and the propeller motor will run at 25 R. P. M. in the reversed direction corresponding to an astern speed of the ship of about 2.5 knots.

The generator 2 of this equipment is rather large for its output since the cutting of the flux is only $\frac{10}{25}$th of what it would be for direct current excitation and the same speed and I therefore design this generator with about twice the flux and about 1¼ as many turns as for a normal 25 cycle generator for this same speed with direct current excitation for a given kw output at a given voltage. By overexciting the synchronous motor 8, I can obtain the greater part of the excitation for the generator 2 from its stator windings and thus relieve the 15 cycle rotor windings of a great deal of the burden which would otherwise devolve upon them. By taking this feature into account, the rotor may be designed so as not to be particularly crowded, in fact this feature will materially decrease the size of the generator. The proportions of the 12-pole synchronous motor are such that there is no difficulty in finding room for a liberal winding, which may be sufficiently excited to obtain the leading current required for this purpose. The exciter set may also be used for furnishing either direct or alternating current for auxiliaries in general and if desirable, a motor driven fan may be supplied therefrom for circulating cooling air through the main generator and motor. In the modifications so far described the variation in frequency of the motor current is secured by varying the speed of the generator rotor while maintaining the frequency of the polyphase exciting current constant. It is apparent, however, that the frequency of the motor current may be controlled by varying the frequency of the exciting current instead of, or in addition to, varying the speed of the generator rotor. If both of these factors which control the result are varied the magnitude of the variation required in each is lessened.

In Fig. 4 I disclose the application of my invention to a ship propulsion system where the control of the propeller motor is obtained by varying the frequency of the polyphase excitation of the main generator. Referring to Fig. 4, 1 represents a high speed turbine constituting the prime mover for the system. This turbine may be adapted to run at a constant speed of 3600 R. P. M. and to drive a direct connected, bipolar alternating current generator 2 which supplies power through the polyphase line 6 to an 8-pole synchronous motor 8 for driving the directly connected ship propeller 10. On the same shaft with the main generator 2 there is represented a small auxiliary alternator 17. This alternator 17 should be about $\frac{1}{20}$th the capacity of the main generator 2 and is of the usual form, excited by direct current and supplies a constant periodicity, 60 cycle, polyphase current to a 20-pole induction motor 18. The rotor of the induction motor 18 is provided with slip rings 19 from which connection is led to a rheostat 20 by which the speed of the induction motor may be varied from substantially synchronous speed down to 18 percent below synchronous speed. Directly connected to the induction motor 18 is a 22-pole synchronous generator 21 which is connected to the slip rings of the rotor of the main generator 2 for supplying thereto polyphase exciting current. Any suitable source of direct current indicated by the mains 22 may be used to excite the auxiliary generators and the synchronous motor.

By suitable adjustment of the rheostat 20, the speed of the exciter set can be reduced to 294 R. P. M. and the generator 21 will supply a polyphase alternating current of approximately 54 cycles to the rotor of the main generator 2. The phase rotation of this 54 cycle current is such that the polyphase magnetic field set up thereby in the generator 2 rotates in the opposite direction to that in which the rotor 3 is driven by the prime mover. Consequently, under these conditions a 6-cycle polyphase alternating current is generated in the stator of the alternator 2 and is available to drive the propeller motor 8 at a speed of 90 R. P. M. corresponding to the full ahead speed of 9 knots of the ship. By simply manipulating the rheostat 20 in the rotor circuit of the induction motor 18 so as to vary the speed of the motor generator set 18, 21 between 294 and 327 R. P. M., the frequency of the exciting current for the generator may be varied between 54 and 60 cycles resulting in a generated frequency by the main generator respectively varying between +6 cycles and 0 cycles per second. By then reversing switch 13 and decreasing the speed of the motor generator set 18 to 316 R. P. M., the main generator's frequency is increased to 2 cycles per second and the astern speed of the propeller to 30 R. P. M. These values respectively correspond to motor speeds which will drive the ship between 9 knots ahead to 3 knots astern. The following table shows in a comprehensive way the relation existing between the various elements of the system as the speed is varied.

| Speed of motor generator set | Frequency of exciter alternator | Frequency supplied to motor | Propeller motor speed | Ship speed |
|---|---|---|---|---|
| R. P. M. | Cycles | Cycles | R. P. M. | Knots |
| 294 | 54 | +6 | 90 | 9 |
| 299.5 | 55 | 5 | 75 | 7.5 |
| 305 | 56 | 4 | 60 | 6.0 |
| 310.5 | 57 | 3 | 45 | 4.5 |
| 316 | 58 | 2 | 30 | 3.0 |
| 321.5 | 59 | 1 | 15 | 1.5 |
| 327 | 60 | 0 | 0 | 0 |
| 321.5 | 59 | −1 | −15 | −1.5 |
| 316 | 58 | −2 | −30 | −3.0 |

The cost of the small variable speed motor generator set is at the most not over 10 percent of the main set. Since this set is only about $\frac{1}{20}$th the capacity of the main set, a negligible amount of power will be dissipated in the rheostat used for control, since it is only required to provide a slip ranging between 18% and 9%, and the ease with which the ship may be controlled by simply varying the speed of this small set a limited amount is thereby increased. The generator 17 may, if desired, provide a supply of 60 cycle constant frequency current for use for other purposes about the ship.

In Fig. 5 I illustrate my invention applied to a motor drive such as is met with in electrically driven rolling mills. For the purposes of clear exposition a specific installation will be assumed. In this figure the main generating unit comprises a fly-wheel motor generator set. The set is driven at a normal speed of 1782 R. P. M., assuming 1% slip, by a 4-pole squirrel cage induction motor 1 from a source of 60 cycle supply 23. The fly-wheel is represented at 24 and the main alternating current generator which is also a 4-pole machine is indicated at 2. The 60 cycle source of supply also furnishes power to run a smaller motor generator set which supplies excitation to the main generator. The motor of the exciter set is a 40-pole induction motor 18 the speed of which is adapted to be varied between 161 and 170 R. P. M. by regulating the resistance 20 connected through slip rings 19 to the rotor of the induction motor. The alternator 21 of the exciter set has 42 poles. Its rotor is excited from a direct current source 22 and its stator winding is connected to excite the rotor of the main generator 2. The alternator 21 will generate a frequency varying between 56.4 and 59.4 cycles as the speed of the set is varied respectively between 161 and 170 R. P. M. Connected to the stator of the main generator 2 by means of the polyphase line 6 is a 4-pole, squirrel cage, induction motor 8 adapted to drive a load, indicated at 25, such as a rolling mill, at any speed up to 90 R. P. M., neglecting slip, in either direction. Such a motor will require an alternating current whose periodicity varies between +3 and −3 cycles per second. Now, bearing in mind that the rotating magnetic field set up by the exciting current in the rotor of the main generator is opposite in direction to that in which the rotor is being driven and the principle of operation previously described in connection with Figs. 1, 2, 3 and 4, it will be apparent that by simply varying the speed of the exciter set from 161 R. P. M. up to 170 R. P. M. and back again to 161 R. P. M. and reversing the line 6 at 13, the frequency of the current may be varied from +3 cycles to a −3 cycles per second and correspondingly vary the speed of the motor 8 from 90 R. P. M. in one direction to 90 R. P. M. in the opposite direction. The exciter set need be only $\frac{1}{20}$th the capacity of the main set and since its maximum slip is only 11 per cent, a comparatively small amount of power is consumed in the regulating rheostat 20; the average loss in the rheostat being less than 6% of the power input to the motor 18 which it controls.

The use of low frequency current for driving the main motor 8 is advantageous for a number of reasons. A 3-cycle 2500 hp squirrel cage motor will have a power factor of about 0.96 and an efficiency of fully .96. The stalling load will be inherently far above any requirement, this being an attribute for such a low periodicity motor for the speed in question. Furthermore, the motor will be of small diameter as compared with its length and consequently light and inexpensive for its output. For a reversing motor these proportions give minimum momentum and a minimum of energy required for reversal.

The exciter set, because of the large number of poles required, will be rather large for its output but it is evident to those skilled in the art that instead of 40 poles for the motor 18 and 42 poles for the generator 21, I may, for example, use 20 and 22 poles respectively. In that case the range of speed of the exciter set 18, 21 would be required to be from 307.5 R. P. M. for providing 56.4 cycles, up to 324 R. P. M. for providing 59.4 cycles. The loss of power in the rheostat 20 would thus be increased, since the motor 18 would be required to run with slips ranging between 15 per cent for its lowest speed and 10 per cent for its highest speed. It is also evident that under certain conditions it might be better to use a synchronous motor instead of the induction motor 8 for driving the main load. These considerations are matters of detail and do not affect the general nature of the scheme but show the adaptability of my invention to various conditions.

In Fig. 6 is shown diagrammatically a further modification of my invention suitable for the conditions met with in rolling mill work. In this figure I show the main generator 2 driven by a variable speed induction motor 1' and the excitation as furnished by a constant speed exciter set supplied from the same source of power that supplies the motor 1'. For the purpose of illustrating a practical application under these conditions, I may make the main induction motor 1' a 4-pole machine and supply it from a source of 60 cycle energy 23. For varying the speed of this motor, I may use a suitable speed varying means such as a Scherbius set, not shown, connected through the line 26 to the slip rings of the secondary of the induction motor 1'. By this means the speed of the induction motor is adapted to be varied from about 1670 R. P. M. corresponding to about 7 per cent slip, up to some 1782 R. P. M. corresponding to about one per cent slip. The 2-pole induction motor 18 of the exciter set may be supplied from the 60 cycle source 23 and may be designed to have about 3.4 per cent slip and consequently run at 3480 R. P. M. Directly connected to the shaft of this motor is a 4-pole frequency changer 21 whose stator is supplied from the 60 cycle source 23 and whose rotor is provided with slip rings and electrically connected to supply a constant frequency, alternating current for exciting the rotor of the main generator 2. The frequency which will be supplied from this frequency changer when driven at 3480 R. P. M. will be 56 cycles per second. The main generator 2 is a 4-pole machine and when its rotor is excited by a 56 cycle current connected to produce a magnetic field which rotates in a direction opposite to that in which the rotor is driven, it will generate a polyphase alternating current varying in frequency, on the motor side of the reversing switch 13, from +3 cycles to −3 cycles as its speed is respectively varied from about 1770 down to about 1680 and then increased to 1770 R. P. M. Only approximate figures can be given since the amount of the load and the temperature of the windings introduce variations which will be reconciled by the speed varying means 26. The generator stator 2 is connected through the polyphase line 6 to a 4-pole induction motor 8. This induction motor is directly connected to a load indicated at 25 and in accordiance with the principle of my invention previously described, it will drive said load at any speed up to 90 R. P. M. in either direction when the speed f the main induction motor 1 is correspondingly adjusted between 1782 and 1670 R. P. M. By this arrangement, I avoid the use of so large an exciter set as is necessary in the system described in connection with Fig. 5. In the system of Fig. 6 the exciter set runs at 3480 R. P. M. and is consequently smaller and less expensive.

Although my invention has been illustrated with 3-phase systems, it is evident to those skilled in the art that any other number of phases may be used and that the invention is applicable to operate any alternating current motor capable of being reversed by reversing the phase rotation of its supply circuit. Since the motor used in connection with my invention may always be started with practically zero frequency, it is apparent that said motor may be designed to give the requisite torque without the provision of special starting mechanism. Several applications of my invention have been explained above from which it is evident that various other combinations of frequencies and various other arrangements of the apparatus might be had without departing from the spirit of my invention and I intend to include in the appended claims all arrangements and modifications as fall within the scope of my invention.

What I claim as new and desire to secure by Letters Patent of the United States, is:—

1. An electric power system comprising a low speed low frequency motor, a high speed bipolar polyphase generator for supplying said motor, said generator comprising phase wound rotor and stator elements, means directly connected to said rotor element for driving the rotor at a high rate of speed in one direction only, means for supplying said rotor element with polyphase exciting current of a frequency nearly equal to the frequency which would be generated to said stator element with direct current bipolar excitation in the rotor element, the phase rotation of said polyphase exciting current being such that the magnetic field produced thereby in the rotor element rotates backwardly with respect to the direction in which the rotor is driven, whereby a low frequency alternating current is induced in said stator element of a frequency dependent upon the relation between the speed of the rotor and the frequency of the exciting current, means for supplying said low frequency current to said motor and means for varying the relation between the speed of the driving means and the frequency of the exciting current to control the speed of operation of said low frequency motor.

2. The method of operating an electric power system wherein a low frequency multipolar, variable speed, reversible work motor is supplied through a reversing switch from a high speed polyphase alternating current generator having phase wound, rotor and stator elements which comprises exciting the rotor element with polyphase alternating current having a phase rotation such as to produce a magnetic field in the rotor rotating backwardly with respect to the rotor, maintaining such a relationship between the speed of the rotor and the frequency of the alternating exciting current that the rotating field revolves in space in the same direction as the rotor to induce low frequency current in the generator stator element for the operation of said motor and which comprises producing a continuous change in said relationship until the speed of the revolving field in space is nearly zero, then operating the reversing switch and then progressively increasing the speed of the rotating field in space in the same direction as the rotor to induce in said stator element a low frequency current for operation of said motor in the reverse direction.

3. An electric ship propulsion system comprising a low frequency, polyphase synchronous propeller driving motor, a polyphase alternating current generator having a stator electrically connected to supply said motor, and having a phase wound rotor, an engine for driving said rotor in one direction, means for supplying a polyphase exciting current to said phase wound rotor of a frequency and phase rotation such that the magnetic field produced in the rotor rotates backwardly with respect to the rotor at a speed but slightly lower than the speed of the rotor, whereby normal low frequency current is generated in said stator, means whereby the relationship between the speed of the rotor and the frequency of the exciting current may be varied to cause the generated frequency to be reduced to zero, and means for reversing the phase rotation of the current supplied to said motor.

4. The method of reversing the phase rotation of an electric motor arranged to be supplied with current from a generator having an exciting winding operatively associated with a source of polyphase current for producing a magnetic field rotating at a different speed from that of its rotor which consists in maintaining the rotation of said generator rotor and the energization of its exciting winding and during such operation reducing the difference between the rotational speeds of said rotor member and said magnetic field relative to one another, reversing the phase rotation between said motor and said generator when said speeds are substantially equal, and thereafter increasing the difference between the rotational speeds of said rotor member and said magnetic field relative to one another.

5. The combination of an alternating current generator comprising phase wound field and armature windings, an alternating current motor designed for normal operation at a frequency not greater than 30% of the frequency at which said generator would operate if direct current were supplied to said field winding, means for exciting said generator to produce current of the normal frequency of said motor, and means for transmitting current between said generator and motor.

In witness whereof, I have hereunto set my hand this 20th day of December, 1921.

HENRY M. HOBART.